US010800530B2

(12) United States Patent
Boodaghians

(10) Patent No.: US 10,800,530 B2
(45) Date of Patent: Oct. 13, 2020

(54) SYSTEMS AND METHODS FOR MANAGING GREY WATER ONBOARD AN AIRCRAFT

(71) Applicant: MAG Aerospace Industries, LLC, Carson, CA (US)

(72) Inventor: Razmik B. Boodaghians, Glendale, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 13 days.

(21) Appl. No.: 16/336,886

(22) PCT Filed: Sep. 30, 2016

(86) PCT No.: PCT/US2016/054913
§ 371 (c)(1),
(2) Date: Mar. 26, 2019

(87) PCT Pub. No.: WO2018/063373
PCT Pub. Date: Apr. 5, 2018

(65) Prior Publication Data
US 2019/0248496 A1 Aug. 15, 2019

(51) Int. Cl.
*H01M 8/04* (2016.01)
*B64D 11/02* (2006.01)
(Continued)

(52) U.S. Cl.
CPC .............. *B64D 11/02* (2013.01); *C02F 1/283* (2013.01); *C02F 1/461* (2013.01); *C02F 9/00* (2013.01);
(Continued)

(58) Field of Classification Search
CPC ..................................................... H01M 8/04
See application file for complete search history.

(56) References Cited

U.S. PATENT DOCUMENTS

2005/0271917 A1* 12/2005 Hoffjann ............. H01M 8/2495
429/414
2012/0073982 A1 3/2012 Lambie
2014/0021112 A1 1/2014 Boodaghians et al.

FOREIGN PATENT DOCUMENTS

FR          3002221       8/2014
WO       2013043982       3/2013
WO       2014004833       1/2014

OTHER PUBLICATIONS

International Patent Application No. PCT/US2016/054913, International Search Report and Written Opinion, dated Jun. 8, 2017.

* cited by examiner

*Primary Examiner* — Jacob B Marks
(74) *Attorney, Agent, or Firm* — Kilpatrick Townsend & Stockton LLP

(57) ABSTRACT

Disclosed are systems and methods of managing grey water or other recycled water onboard an aircraft based on demand within the aircraft. In some cases, the grey water is obtained from a lavatory or galley sink of the aircraft and is treated to purify and/or filter the grey water. The treated grey water can be routed within the aircraft according to a control scheme that accounts for demand within the aircraft. For example, some or all of the treated water may undergo electrolysis to produce oxygen gas (O2) and hydrogen gas (H2), some or all of which may be fed into the fuel cell system and used in a chemical reaction to produce electrical energy and other fuel cell by-products that can be directed to various aircraft systems and/or the aircraft cabin/lavatories.

22 Claims, 3 Drawing Sheets

(51) Int. Cl.
  *C25B 15/08*   (2006.01)
  *H01M 8/0662*  (2016.01)
  *C02F 9/00*    (2006.01)
  *C25B 1/02*    (2006.01)
  *C02F 1/28*    (2006.01)
  *C02F 1/461*   (2006.01)
  *C25B 1/04*    (2006.01)
  *H01M 8/0656*  (2016.01)
  *B64D 41/00*   (2006.01)
  *C02F 103/00*  (2006.01)

(52) U.S. Cl.
  CPC .................. *C25B 1/02* (2013.01); *C25B 1/04* (2013.01); *C25B 15/08* (2013.01); *H01M 8/0656* (2013.01); *H01M 8/0662* (2013.01); *B64D 2041/005* (2013.01); *C02F 2103/002* (2013.01); *Y02T 50/46* (2013.01)

SYSTEMS AND METHODS FOR MANAGING GREY WATER ONBOARD AN AIRCRAFT

FIELD OF THE INVENTION

Systems and methods for managing grey water onboard an aircraft.

BACKGROUND

Spent water from galley or lavatory sinks on an aircraft is generally referred to as "grey water," which is used water that does not contain sewage. This used water may contain soap, detergents, leftover portions of beverages, or other containments.

Grey water is typically held onboard the aircraft in waste tanks that are emptied upon landing. Recently, attempts have been made to treat this grey water so it can be re-used for other purposes onboard the aircraft. For example, U.S. Patent Publication No. 2014/0021112 titled "Systems and Methods for Treating Grey Water On-board Passenger Transport Vehicles" (now allowed), the contents of which are incorporated herein by this reference, discloses systems for treating and cleansing grey water. Once treated, the grey water can be directed to faucets for re-use in hand or other washing or directed for use in flushing the toilet.

Re-using grey water instead of requiring fresh water is desirable due to the cost, weight and size constraints of maintaining fresh water onboard an aircraft. For example, if less fresh water is required (and thus less water is brought onboard the aircraft), the aircraft is more fuel efficient upon takeoff because it is lighter.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Disclosed are systems and methods of managing grey water onboard an aircraft. The grey water can be treated to purify and/or filter the water and can be directed as appropriate within the aircraft. For example, at least part of the treated grey water may undergo electrolysis to produce oxygen gas ($O_2$) and hydrogen gas ($H_2$), which can be subsequently fed as inputs into a fuel cell.

In some cases, the treated grey water is routed within the aircraft based on a control scheme that accounts for demand within the aircraft. For example, if more grey water is available than is needed by the fuel cell, the remainder of the treated grey water can be directed to the aircraft's potable water reservoir, where it can be used in the aircraft lavatories and/or galleys as needed, or the treated grey water can be routed directly to the aircraft's lavatories and/or galleys on an as-needed basis. In some cases, after the treated grey water undergoes electrolysis, at least part of the resulting oxygen gas can be directed into the aircraft cabin/lavatory as needed (for example, in the event of a cabin pressure change), and the resulting hydrogen gas can be piped overboard into the atmosphere when it is not needed by the fuel cell or if the fuel cell is not operational.

BRIEF DESCRIPTION OF THE DRAWINGS

The specification makes reference to the following appended figures.

DETAILED DESCRIPTION

Disclosed herein are systems and processes for managing grey water or other recycled water that does not contain sewage collected on an aircraft. While this disclosure focuses on managing grey water on an aircraft, it is not so limited and the disclosure may be applied in buses, trains or other forms of transportation.

Figure 1:
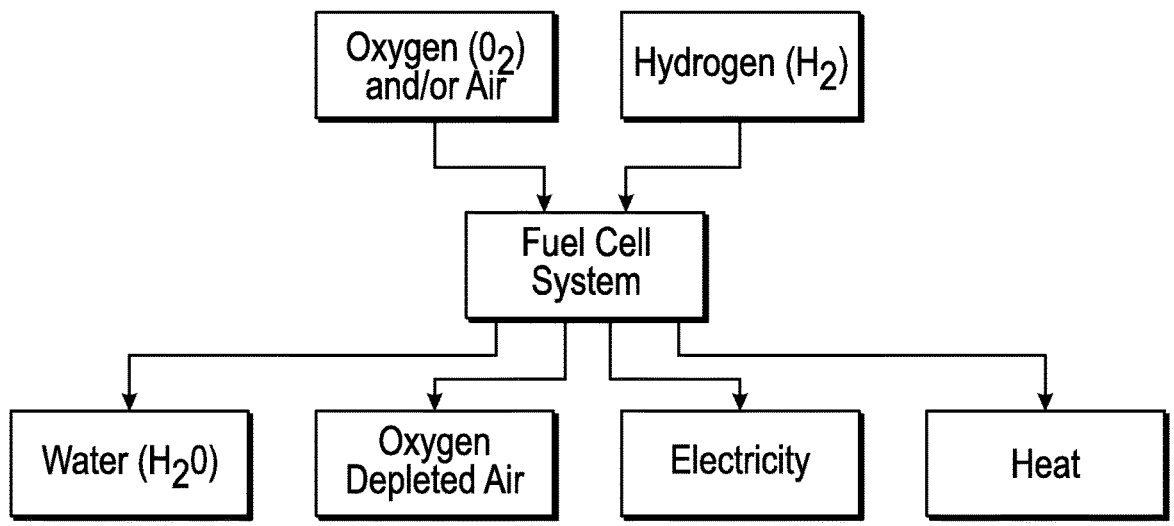
FIG. 1 shows an exemplary schematic of input elements that may be used for a fuel cell and output elements of the fuel cell.

As discussed in detail below, the collected grey water may be treated and at least part of the treated grey water may undergo electrolysis to produce oxygen gas ($O_2$) and hydrogen gas ($H_2$), which can be subsequently fed as inputs into a fuel cell. A fuel cell is a device that converts chemical energy from a chemical reaction into electrical energy. As illustrated in FIG. 1, hydrogen gas combines with oxygen gas in a fuel cell to generate electrical energy (electricity) along with byproducts such as water, thermal power (heat), and oxygen-depleted air (ODA). Some or all of these fuel cell outputs may be used to operate various systems onboard an aircraft and/or may be directed to the aircraft cabin, galleys or lavatories.

Any appropriate fuel cell may be used, including, but not limited to, a Proton Exchange Membrane Fuel Cell (PEMFC), a Solid Oxide Fuel Cell (SOFC), a Molten Carbonate Fuel Cell (MCFC), a Direct Methanol Fuel Cell (DMFC), an Alkaline Fuel Cell (AFC), or a Phosphoric Acid Fuel Cell (PAFC). Any other existing or future fuel cell system technology, including but not limited to a hybrid solution, may also be used. Since fuel cells rely heavily on the fuel cell catalyst, it is important that the inputs to the fuel cell be free of detergents and other contaminants that might damage the fuel cell catalyst or other parts of the fuel cell. Thus, care must be taken when using grey water as the starting material instead of fresh water to ensure the treated grey water has a sufficient level of purity.

Figure 2:
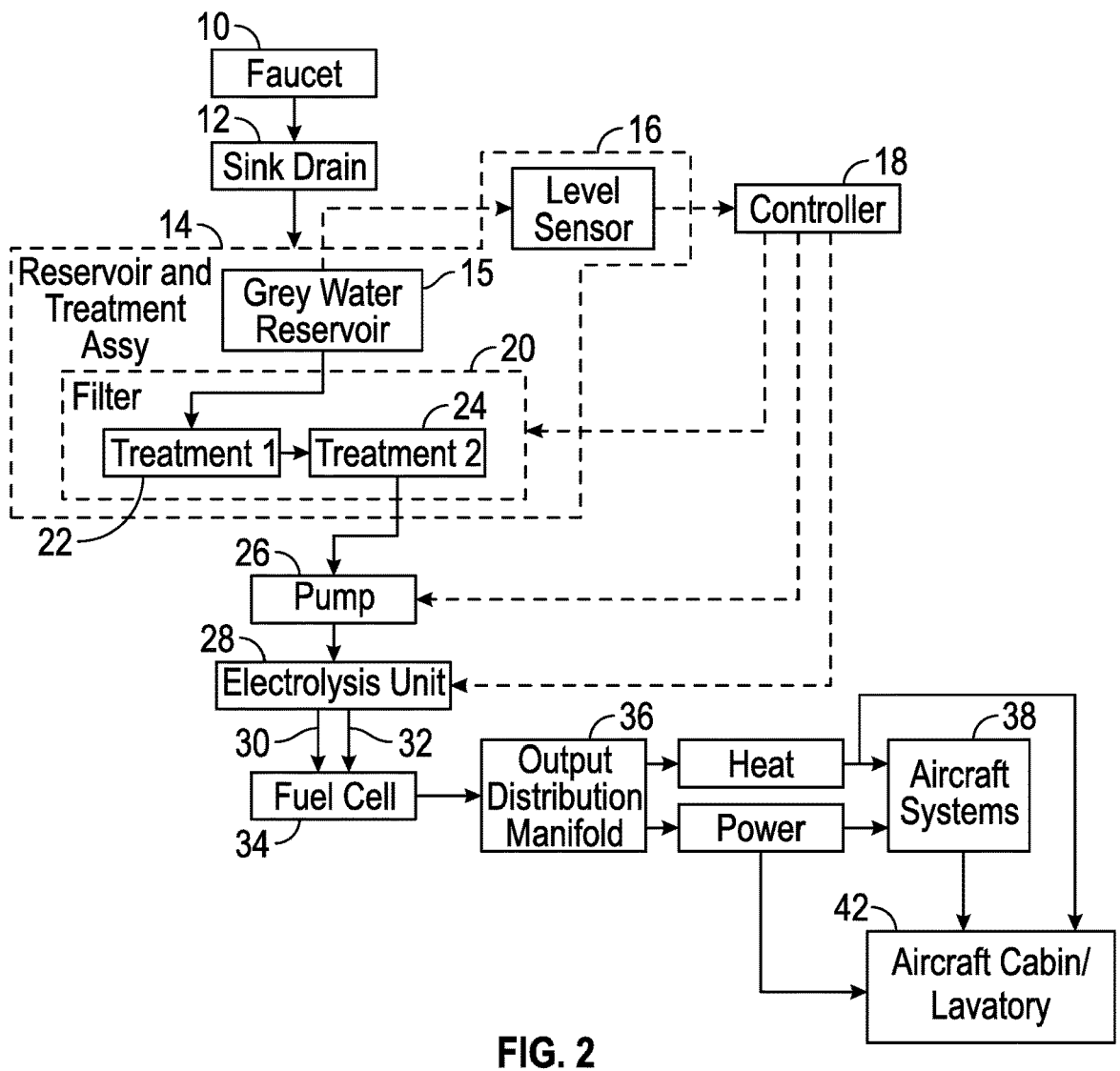
FIG. 2 shows an exemplary schematic of powering a fuel cell using grey water.

An exemplary system for using grey water on an aircraft in shown in FIG. 2. In FIG. 2, the collected grey water is used to power a fuel cell 34. As illustrated in FIG. 2, used water from a faucet 10 may drain through a drain 12 into a grey water reservoir 15 of a reservoir and treatment assembly 14. If desired, a sensor 16 may be communicably coupled to the grey water reservoir 15 for monitoring the amount of water present in the grey water reservoir 15, the flow rate of the water flowing into the grey water reservoir 15 or another characteristic of the water within the grey water reservoir 15. Any suitable sensor may be used. A controller 18 may be communicatively coupled with the sensor 16 for analyzing the information sensed by the sensor 16 and communicating instructions based on the sensed information, such as level/amount of grey water present in the grey water reservoir 15 or the demand for grey water by a particular application within the aircraft.

The reservoir and treatment assembly 14 may also include a treatment unit 20 for treating the grey water stored in the grey water reservoir 15. The grey water stored in the grey water reservoir 15 may drain by gravity or be pumped into the treatment unit 20. In some cases, the grey water passes through the treatment unit 20 before accumulating in the grey water reservoir 15. In other cases, the grey water stored in the grey water reservoir 15 is directed through the treatment unit 20 on a periodic basis, on an as-needed basis such as based on instructions received from the controller 18, manually through user input, or otherwise. The system may be configured so that the controller 18 empties the grey water reservoir 15 on a predetermined schedule, manually through user input, and/or based on information sensed from the sensor 16. Although the treatment unit 20 is illustrated as part of the reservoir and treatment assembly 14, it need not be.

The treatment unit 20 may include one or more treatments, such as treatments 22, 24, for treating the grey water using any existing or future technology. Treatments 22, 24 may be filters such as mesh screens that remove solids and/or purify the water to remove any bacteria and viruses present in the grey water, or other suitable technology. As one non-limiting example, treatments 22, 24 may be nano carbon technology, such as but not limited to Nanomesh technology offered by Carbon Black Technology, to filter and/or purify the grey water. As another example, treatments 22, 24 may use ultraviolet germicidal light as known to one skilled in the art to purify the water. U.S. Patent Publication No. 2014/0021112 titled "Systems and Methods for Treating Grey Water On-board Passenger Transport Vehicles" (now allowed), the contents of which are incorporated by reference herein, describes another non-limiting method of treating grey water that may be used by the treatment unit 20. WO Publication No. 2014/004833 titled "Microbiologically Protected Fuel Cell," the contents of which are incorporated herein by this reference, describes yet another non-limiting purification system that may be used by treatment unit 20. Any suitable combination of known purification and/or filter systems may be also be used. In some cases, the grey water is only filtered to remove any solid material.

After it has been treated, the grey water may drain by gravity or be pumped by a pump 26 into an electrolysis unit 28 that uses electricity to separate the water molecules into oxygen gas ($O_2$) and hydrogen gas ($H_2$). In some cases, the controller 18 controls the operation of the pump 26 and/or the electrolysis unit 28. As with the treatment unit 20, the grey water stored in the grey water reservoir 15 may be directed into the electrolysis unit 28 on a periodic basis, on an as-needed basis such as based on instructions received from the controller 18, manually through user input, or otherwise. The system may be configured so that the controller 18 causes the pump 26 to direct the treated grey water from the grey water reservoir 15 into the electrolysis unit 28 on a predetermined schedule and/or based on information sensed from the sensor 16. In some instances, as explained more below, the controller 18 causes the pump 26 to direct the treated grey water from the grey water reservoir 15 into the electrolysis unit 28 based on demand of the fuel cell 34 and/or various aircraft systems 38.

The electrolysis unit 28 may employ any known or future method of separating the water into hydrogen gas 30 and oxygen gas 32, including using an anode and a cathode separated by an electrolyte or using a single-catalyst water splitter.

Next, as illustrated in FIG. 2, the separated hydrogen gas ($H_2$) 30 and oxygen gas ($O_2$) 32 are fed as inputs into the fuel cell 34. The fuel cell 34 converts chemical energy from the chemical reaction involving the hydrogen gas 30 and the oxygen gas 32 into electrical energy (power) and heat through an output distribution manifold 36. The electrical energy and heat, along with any other byproduct of the fuel cell 34 such as oxygen depleted air and water, may be directed to one or more aircraft systems 38 and/or routed directly to the aircraft cabin/lavatories 42 based on demand or other factors. In some cases, the controller 18 controls where the outputs are directed. The controller 18 may direct the outputs of the fuel cell 34 based on user input, a predetermined schedule, information sensed by the sensor 16, modeling, or otherwise.

In some cases, the treated grey water is directed into the electrolysis unit 28 only when the fuel cell 34 needs inputs, such that the electrolysis is only performed by the electrolysis unit 28 on an as-needed basis. In this way, in some cases, the treated grey water is immediately used by the fuel cell 34 after it is converted into hydrogen gas 30 and oxygen gas 32 by the electrolysis unit 28. Having treated grey water available for use on demand/an as-needed basis by the fuel cell 34 can eliminate or reduce the need to have onboard the aircraft cylinders and other tanks containing hydrogen gas and oxygen gas, thus eliminating additional weight, storage space and safety concerns with carrying flammable gas onboard.

Figure 3:
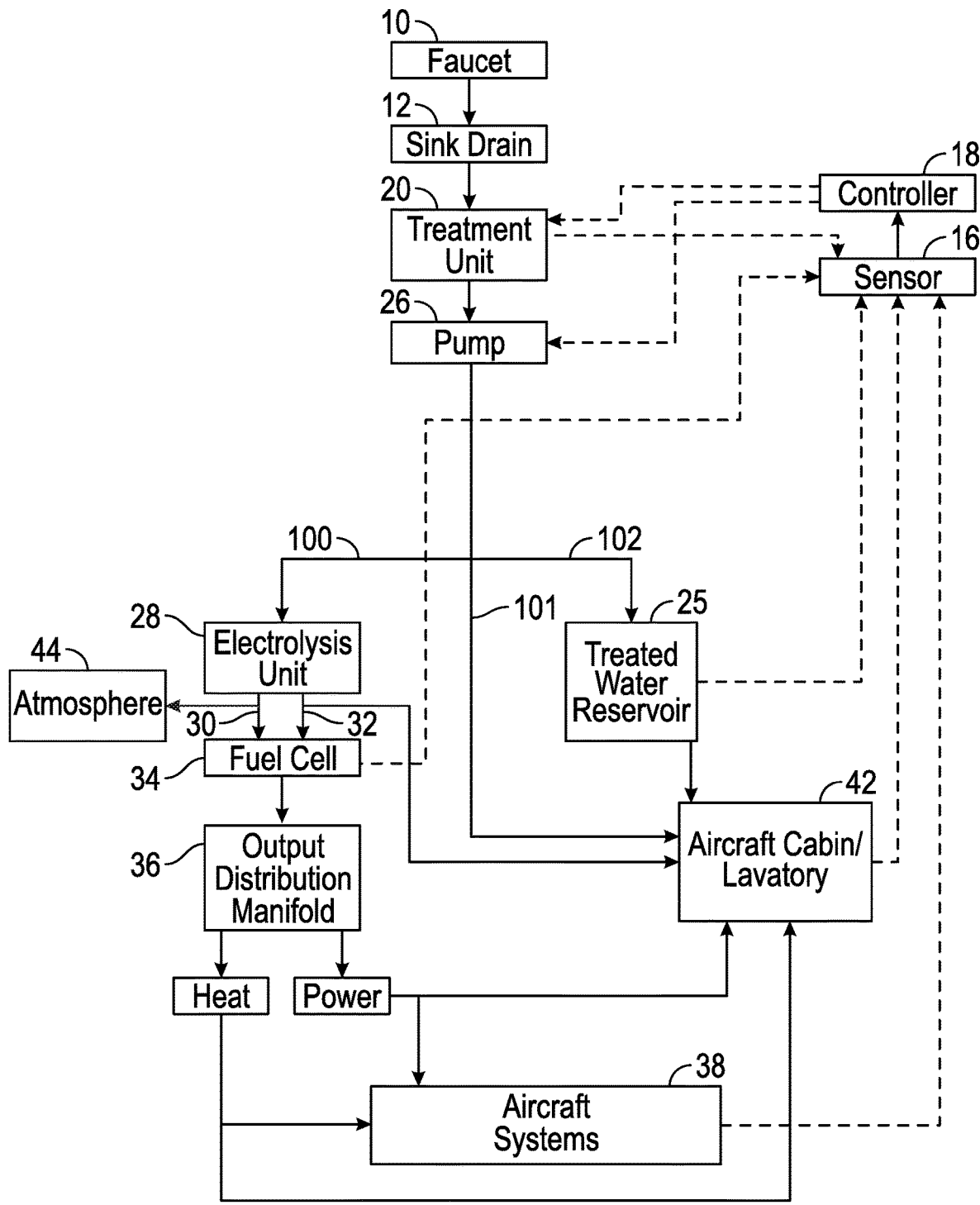
FIG. 3 shows an exemplary schematic of managing grey water onboard an aircraft.
Figure 4:
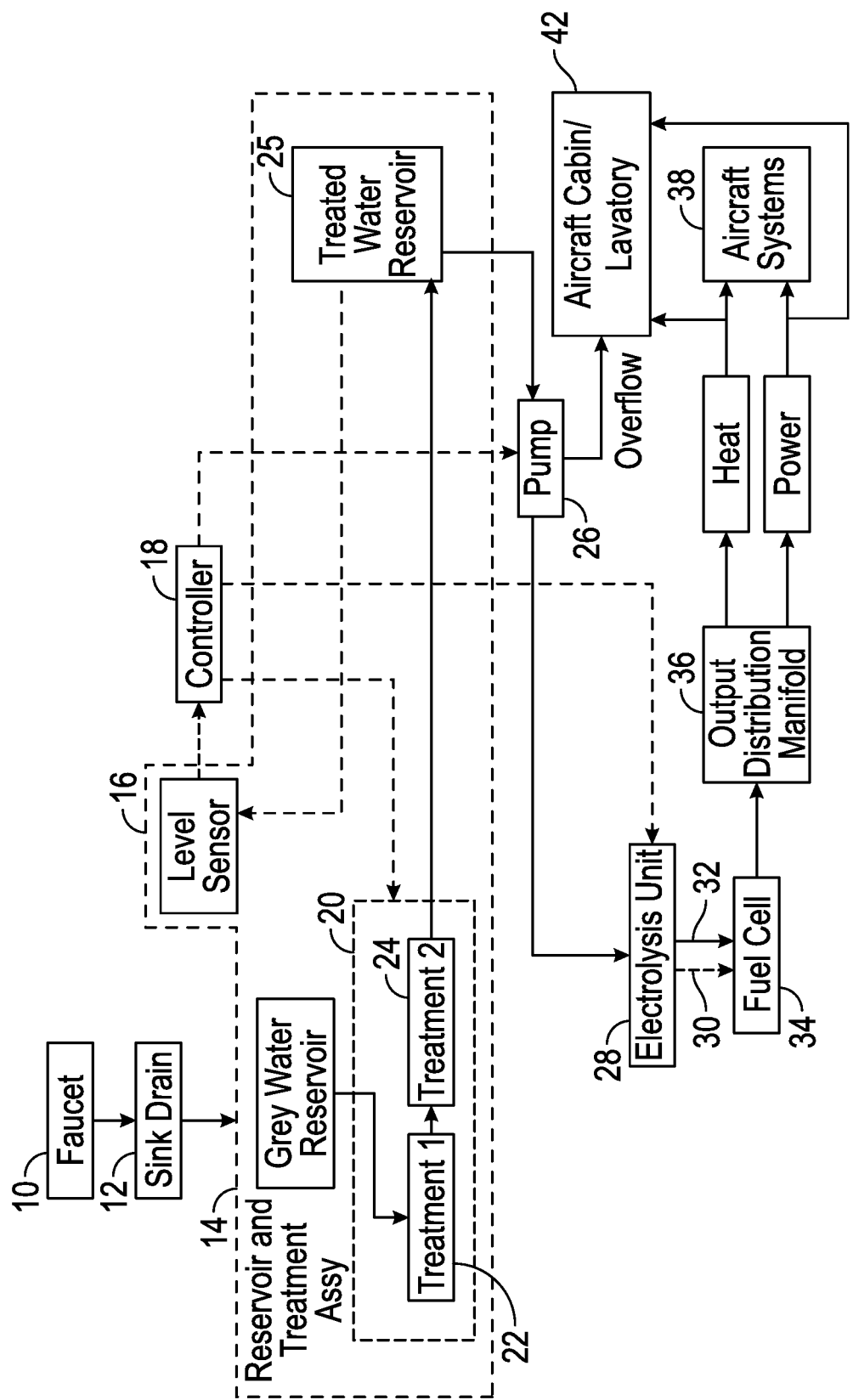
FIG. 4 shows another exemplary schematic of managing grey water onboard an aircraft.

Having treated grey water available for use by the fuel cell 34 on an as-needed basis also allows the treated grey water to be directed for other uses within the aircraft when not currently needed by the fuel cell 34. For example, as illustrated in FIGS. 3-4, instead of being directed to the electrolysis unit 28, the treated grey water could be directed (by the pump 26, gravity or otherwise) to top off or refill the potable water tank or other aircraft water system that supplies potable water to the galley and/or the lavatory. Alternatively or additionally, the treated grey water could be diverted directly to the lavatory and/or the galley as needed instead of to the electrolysis unit 28. Diverting treated grey water directly into the lavatory and/or the galley instead of a potable water tank might help eliminate or reduce the amount of extra piping required. In some cases, a portion of the treated grey water is directed to the electrolysis unit 28 based on demand of the fuel cell 34 and/or the amount of water present in the aircraft's water system (e.g., when the aircraft water system is full or has a sufficient volume of water, excess treated grey water can be diverted into the electrolysis unit 28).

FIG. 3 shows another exemplary system for managing grey water on an aircraft. Similar to the system of FIG. 2, water drains from a faucet 10 through a sink drain 12. Instead of draining into a grey water reservoir, however, the water is pumped by pump 26 or otherwise directed through a treatment unit 20, which can be similar to the treatment units 20 described above. In one non-limiting example, the treatment unit 20 has a cylindrical shape, though it need not, and houses treatment technology such as nano carbon. Once treated, the treated grey water can be directed throughout the aircraft based on a control system that accounts for demand for the treated grey water within the aircraft upstream of the treatment unit 20. The treated grey water can be directed, either manually or by controller 18, within the aircraft as appropriate based on a predetermined schedule, modeling, demand within the aircraft (which may be based on information sensed by one or more sensors 16), user input, or otherwise. Such control systems provide the advantage of having stored treated grey water available on an aircraft for use on demand.

For example, the treated grey water may be directed along one or more of (1) piping 100 into the electrolysis unit 28 (which may be similar to electrolysis unit 28 described above with respect to FIG. 1), (2) piping 101 that routes the treated grey water into various aircraft systems 38, and (3) piping 102 that routes the treated grey water into a treated water reservoir 25, which may correspond to the aircraft's potable water tank or other water supply and which in turn supplies water to the aircraft cabin (including galleys)/lavatories 42. As illustrated in FIG. 3, one or more sensors 16 may sense information relating to one or more of the fuel cell 34, various aircraft systems 38, the treated water reservoir 25 (e.g., the level or volume of water within the treated water reservoir 25), the aircraft cabin/lavatory 42, the flow rate of the treated grey water into the treated water reservoir 25, etc. and relay such information to the controller 18. As one non-limiting example, once the treated water reservoir 25 reaches a predetermined maximum level, the overflow treated grey water may be directed along piping 100 into the electrolysis unit 28 and/or along piping 101 to the aircraft piping 101 to the aircraft cabin/lavatory 42. As another non-limiting example, if the fuel cell 34 and/or the aircraft systems 38 do not have an immediate demand, the treated grey water may be directed along piping 102 to top off the treated water reservoir 25 and/or directed along piping 101 to the aircraft cabin/lavatory 42. As yet another non-limiting example, if the treated water reservoir 25 reaches a predetermined minimum level, the treated grey water may be directed along piping 102 into the treated water reservoir 25 until a desired level is reached.

Once the treated grey water is separated by the electrolysis unit 28 into hydrogen gas 30 and oxygen gas 32, part or all of these outputs may be directed into the fuel cell 34 based on demand, a predetermined schedule, modeling, user input, etc. If not needed by the fuel cell 34 or if the fuel cell 34 has malfunctioned, part or all of the oxygen gas 32 can be directed into the aircraft cabin/lavatory and the hydrogen gas 30 can be piped overboard into the atmosphere 44. In some cases, the converted oxygen gas 32 can be diverted into the aircraft cabin 42 on an as-needed basis, such as if pressure drops in the aircraft cabin. The pipe(s) routing the hydrogen gas 30 and the oxygen gas 32 from the electrolysis unit 28, as well as the other pipes routing grey water throughout the system, may include valves and flowmeters as needed.

Once converted by the fuel cell 34 into heat and power, these and any other outputs (such as water and oxygen) can be routed as desired into various aircraft systems 38 and/or directly into the aircraft cabin/lavatory 42. As discussed above, the routing of the outputs can be based on instructions from the controller 18, which may be based on information sensed by the sensor 16, such as demand, or the routing of outputs can be based on user input, a predetermined schedule, modeling, etc.

FIG. 4 is another exemplary system of managing grey water on an aircraft. The system of FIG. 4 is similar to the system of FIG. 1, except the treated grey water is routed into a treated water reservoir 25. The treated grey water collected in the treated water reservoir 25 can be routed by the pump 26 or otherwise to the electrolysis unit 28 and/or the aircraft cabin/lavatory 42 as desired, such as described above. As one non-limiting example, the treated grey water can be routed from the treated water reservoir 25 into the electrolysis unit 28 on an as-needed basis and any overflow can be routed to the aircraft cabin/lavatory 42. Although not pictured, the overflow could alternatively or additionally be routed to the aircraft water system. In some cases, the treated water reservoir 25 is part of the aircraft water system.

Aspects of the systems of FIGS. 2-4 may be combined, substituted or modified to arrive at a control system that distributes products produced by the treatment of the collected grey water on an aircraft as desired. The "mode of use/operation" of the control system for managing and/or distributing the treated grey water and the products produced by the treatment of the collected grey water, and subsequent conversion of the treated grey water by electrolysis to hydrogen gas and oxygen gas, can be based on a given aircraft configuration and its requirements, which may vary based on the type of aircraft on which the control system is implemented, the route flown by the aircraft, etc. The disclosed control system provides flexibility by enabling the products generated to be used onboard the aircraft as needed. For example, the system is capable of providing hydrogen gas and oxygen gas to operate the fuel cell and also of diverting the oxygen gas to the aircraft cabin when appropriate. The ability to divert oxygen gas to the aircraft cabin can be considered a redundancy in the sense that, if for some reason oxygen levels drop in the aircraft cabin and the conventional procedure of providing emergency oxygen masks for passengers fails or malfunctions, the oxygen gas produced by electrolysis of the treated grey water can be used to supply the needed oxygen to the aircraft cabin.

Routing the hydrogen gas produced by the electrolysis unit overboard the aircraft is a fail-safe mode of operation when the fuel cell is unable to function properly. In this case, no hydrogen is trapped onboard the aircraft and, at the same time, oxygen gas produced by the electrolysis unit can be routed to the aircraft cabin. Mixing the oxygen gas produced by the electrolysis unit with the air taken onboard the aircraft from the atmosphere and/or supplying the oxygen gas produced by the electrolysis unit without mixing it with air taken onboard can be more efficient and economical because it reduces the quantity of atmospheric air that needs to be pumped and purified onboard the aircraft during flight.

Moreover, implementing a control system as described herein helps decrease costs by saving weight of the aircraft during takeoff since the potable water loaded to the tanks can be decreased (because of the potential to recover and reuse captured grey water onboard the aircraft). Moreover, having the ability to supply hydrogen gas and oxygen gas to the fuel cell from converted grey water decreases safety concerns with bringing flammable hydrogen and oxygen tanks onboard.

The controller 18 can include any number of processors configured for executing program code stored in the memory of the controller Examples of the controller 18 can include a microprocessor, an application-specific integrated circuit ("ASIC"), a field-programmable gate array ("FPGA"), or other suitable processor.

The controller 18 can include (or be communicatively coupled with) a non-transitory computer-readable memory. The memory can include one or more memory devices that can store program instructions. The program instruction can include for example, a management engine that is executable by the processing device to perform certain operations described herein.

The operations can include any of the above described and illustrated actions including collecting, in a reservoir, grey water drained from a faucet of a lavatory or a galley sink of the aircraft.

The operations can further include treating the collected grey water by at least one of filtering and purifying the collected grey water.

The operations can further include directing the treated grey water to an electrolysis unit.

The operations can further include separating the treated grey water into oxygen gas and hydrogen gas by the electrolysis unit. In some cases, the treated grey water is directed to the electrolysis unit as needed by the fuel cell.

The operations can further include inputting the oxygen gas and the hydrogen gas into the fuel cell on the aircraft. In some cases, at least a portion of oxygen gas may be directed to the aircraft cabin, for example if the cabin experiences a sudden pressure change.

The operations can further include directing the treated grey water within an aircraft based on demand. For example, the treated grey water may be directed to an electrolysis unit, to a treated water reservoir, and/or directly to the aircraft cabin, lavatories, galleys, etc.

The foregoing is provided for purposes of illustrating, explaining, and describing embodiments of the invention. Further modifications and adaptations to these embodiments will be apparent to those skilled in the art and may be made without departing from the scope or spirit of the invention. As one example, instead of a fuel cell system, another suitable power source that is independent from the aircraft's main power system may be used.

As used below, any reference to a series of examples is to be understood as a reference to each of those examples disjunctively (e.g., "Examples 1-4" is to be understood as "Examples 1, 2, 3, or 4").

Example 1 is a system for managing grey water within an aircraft, the system comprising a treatment assembly for treating grey water drained from a faucet of a lavatory or a galley sink of the aircraft; a pump for routing the treated grey water; an electrolysis unit for separating the treated grey water into oxygen gas and hydrogen gas; a fuel cell for converting the oxygen gas and the hydrogen gas into electrical energy and heat; and a treated water reservoir for collecting at least a portion of the treated grey water, wherein the system is configured to route the treated grey water to the electrolysis unit and the treated water reservoir.

Example 2 is the system of Example 1, wherein the system further comprises a controller for routing the treated grey water based on predetermined logic.

Example 3 is the system of Example 2, wherein the predetermined logic is at least one of demand of the fuel cell and demand for water from the treated water reservoir.

Example 4 is the system of any of Examples 1-3, wherein the system is configured to route at least part of the oxygen gas to a cabin or a lavatory of the aircraft.

Example 5 is the system of any of Examples 1-4, wherein the system is configured to route at least part of the hydrogen gas overboard the aircraft into an atmosphere outside the aircraft.

Example 6 is the system of Example 3, further comprising one or more sensors that sense at least one of a level of water within the treated water reservoir, information correlated with the demand of the fuel cell, and information correlated with the demand for water from the treated water reservoir.

Example 7 is the system of any of Examples 1-6, wherein the system is configured to route the treated grey water to a cabin or a lavatory of the aircraft.

Example 8 is a method of operating a fuel cell on an aircraft, the method comprising: collecting, in a reservoir, grey water drained from a faucet of a lavatory or a galley sink of the aircraft; treating the collected grey water by at least one of filtering and purifying the collected grey water; directing at least a portion of the treated grey water to an electrolysis unit as needed by the fuel cell; separating the portion of the treated grey water into oxygen gas and hydrogen gas by the electrolysis unit; and inputting the oxygen gas and the hydrogen gas into the fuel cell on the aircraft.

Example 9 is the method of Example 8, further comprising sensing an amount of grey water collected in the reservoir using one or more sensors.

Example 10 is the method of Example 9, wherein a controller directs the grey water to the electrolysis unit based on the sensed amount of grey water collected in the reservoir.

Example 11 is the method of any of Examples 8-10, wherein the treated grey water is pumped into the electrolysis unit by a pump.

Example 12 is the method of any of Examples 8-11, further comprising using the fuel cell to convert the oxygen gas and the hydrogen gas into electrical energy and heat.

Example 13 is the method of Example 12, further comprising directing at least one of the electrical energy and the heat to one or more systems of the aircraft.

Example 14 is the method of any of Examples 8-13, wherein treating the collected grey water comprises purifying the grey water using active carbon.

Example 15 is a method of using grey water on an aircraft, the method comprising: treating the grey water, wherein the grey water is used water obtained from a lavatory sink or a galley sink of the aircraft; performing electrolysis on the treated grey water to obtain oxygen gas and hydrogen gas; and inputting the oxygen gas and the hydrogen gas into a fuel cell.

Example 16 is the method of Example 15, wherein treating the grey water comprises at least one of filtering and purifying the grey water.

Example 17 is the method of any of Examples 15-16, wherein treating the grey water comprises purifying the grey water using active carbon.

Example 18 is the method of any of Examples 15-17, further comprising collecting, in a collection reservoir, the grey water obtained from the lavatory sink or the galley sink.

Example 19 is the method of any of Examples 15-17, further comprising collecting, in a treated water reservoir, the treated grey water.

Example 20 is the method of any of Examples 18-19, further comprising sensing an amount of grey water collected in the reservoir using one or more sensors.

Example 21 is the method of Example 20, wherein the step of performing electrolysis on the treated grey water is based on the sensed amount of grey water collected in the reservoir.

Example 22 is the method of any of Examples 15-21, wherein obtaining the used water from the lavatory sink or the galley sink comprises draining the used water from a faucet of the lavatory sink or the galley sink.

Example 23 is the method of any of Examples 15-22, wherein the electrolysis is performed on the treated grey water based on demand.

The invention claimed is:

1. A system for managing grey water within an aircraft, the system comprising:
   a treatment assembly for treating grey water drained from a faucet of a lavatory or a galley sink of the aircraft;
   a pump for routing the treated grey water;
   an electrolysis unit for separating the treated grey water into oxygen gas and hydrogen gas;
   a fuel cell for converting the oxygen gas and the hydrogen gas into electrical energy and heat; and
   a treated water reservoir for collecting at least a portion of the treated grey water,
   wherein the system is configured to route the treated grey water to the electrolysis unit and the treated water reservoir.

2. The system of claim 1, wherein the system further comprises a controller for routing the treated grey water based on predetermined logic.

3. The system of claim 2, wherein the predetermined logic is at least one of demand of the fuel cell and demand for water from the treated water reservoir.

4. The system of claim 1, wherein the system is configured to route at least part of the oxygen gas to a cabin or a lavatory of the aircraft.

5. The system of claim 1, wherein the system is configured to route at least part of the hydrogen gas overboard the aircraft into an atmosphere outside the aircraft.

6. The system of claim 3, further comprising one or more sensors that sense at least one of a level of water within the treated water reservoir, information correlated with the demand of the fuel cell, and information correlated with the demand for water from the treated water reservoir.

7. The system of claim 1, wherein the system is configured to route the treated grey water to a cabin or a lavatory of the aircraft.

8. A method of using the system of claim 1, the method comprising:
   treating, using the treatment assembly, the drained grey water by at least one of filtering and purifying the drained grey water;
   collecting, in the treated water reservoir, the treated grey water;
   directing at least a portion of the treated grey water to the electrolysis unit as needed by the fuel cell;
   separating the treated grey water into the oxygen gas and the hydrogen gas by the electrolysis unit; and
   inputting the oxygen gas and the hydrogen gas into the fuel cell on the aircraft.

9. The method of claim 8, further comprising sensing an amount of grey water collected in the reservoir using one or more sensors.

10. The method of claim 8, wherein a controller directs the grey water to the electrolysis unit based on the sensed amount of grey water collected in the reservoir.

11. The method of claim 8, wherein the treated grey water is pumped into the electrolysis unit by the pump.

12. The method of claim 8, further comprising using the fuel cell to convert the oxygen gas and the hydrogen gas into electrical energy and heat.

13. The method of claim 12, further comprising directing at least one of the electrical energy and the heat to one or more systems of the aircraft.

14. The method of claim 8, wherein treating the collected grey water comprises purifying the grey water using active carbon.

15. A method of using the system of claim 1, the method comprising:
   treating the grey water drained from the faucet by the treatment assembly;
   performing electrolysis, by the electrolysis unit, on the treated grey water to obtain the oxygen gas and the hydrogen gas; and
   inputting the oxygen gas and the hydrogen gas into the fuel cell.

16. The method of claim 15, wherein treating the grey water comprises at least one of filtering and purifying the grey water.

17. The method of claim 15, wherein treating the grey water comprises purifying the grey water using active carbon.

18. The method of claim 15, further comprising collecting, in a collection reservoir, the grey water obtained from the lavatory sink or the galley sink before treating the grey water.

19. The method of claim 15, further comprising collecting, in a treated water reservoir, the grey water obtained from the lavatory sink or the galley sink after treating the grey water.

20. The method of claim 19, further comprising sensing an amount of grey water collected in the reservoir using one or more sensors.

21. The method of claim 19, wherein the step of performing electrolysis on the treated grey water is based on the sensed amount of grey water collected in the reservoir.

22. The method of claim 15, wherein the electrolysis is performed on the treated grey water based on demand.

* * * * *